June 29, 1943.　　A. A. BARNES ET AL　　2,322,812
BOTTLE CAP APPLYING MACHINE
Filed July 26, 1939　　9 Sheets-Sheet 3

INVENTORS:
Alfred A. Barnes
John F. Price,
BY
Bordell & Thompson
ATTORNEYS.

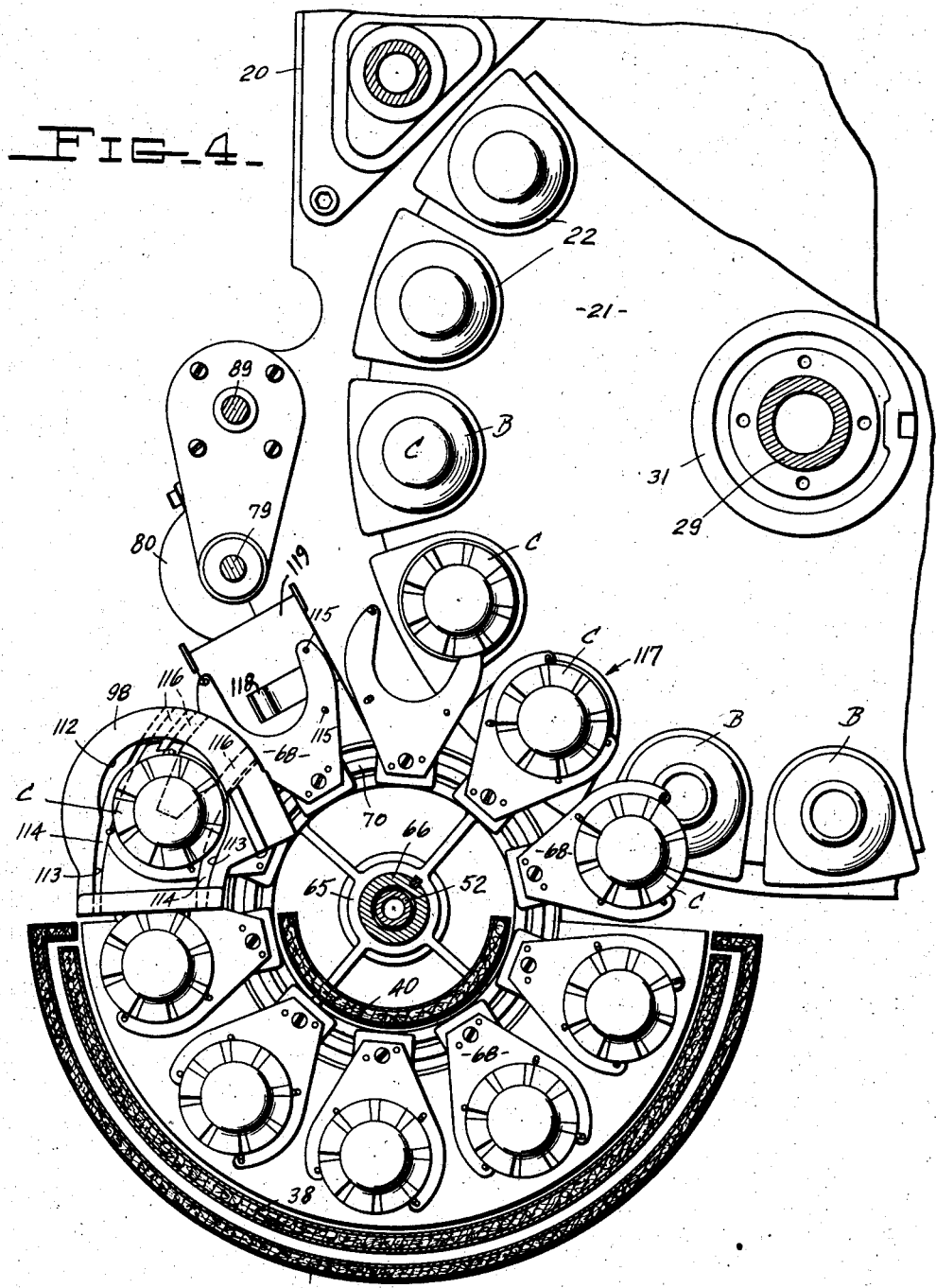

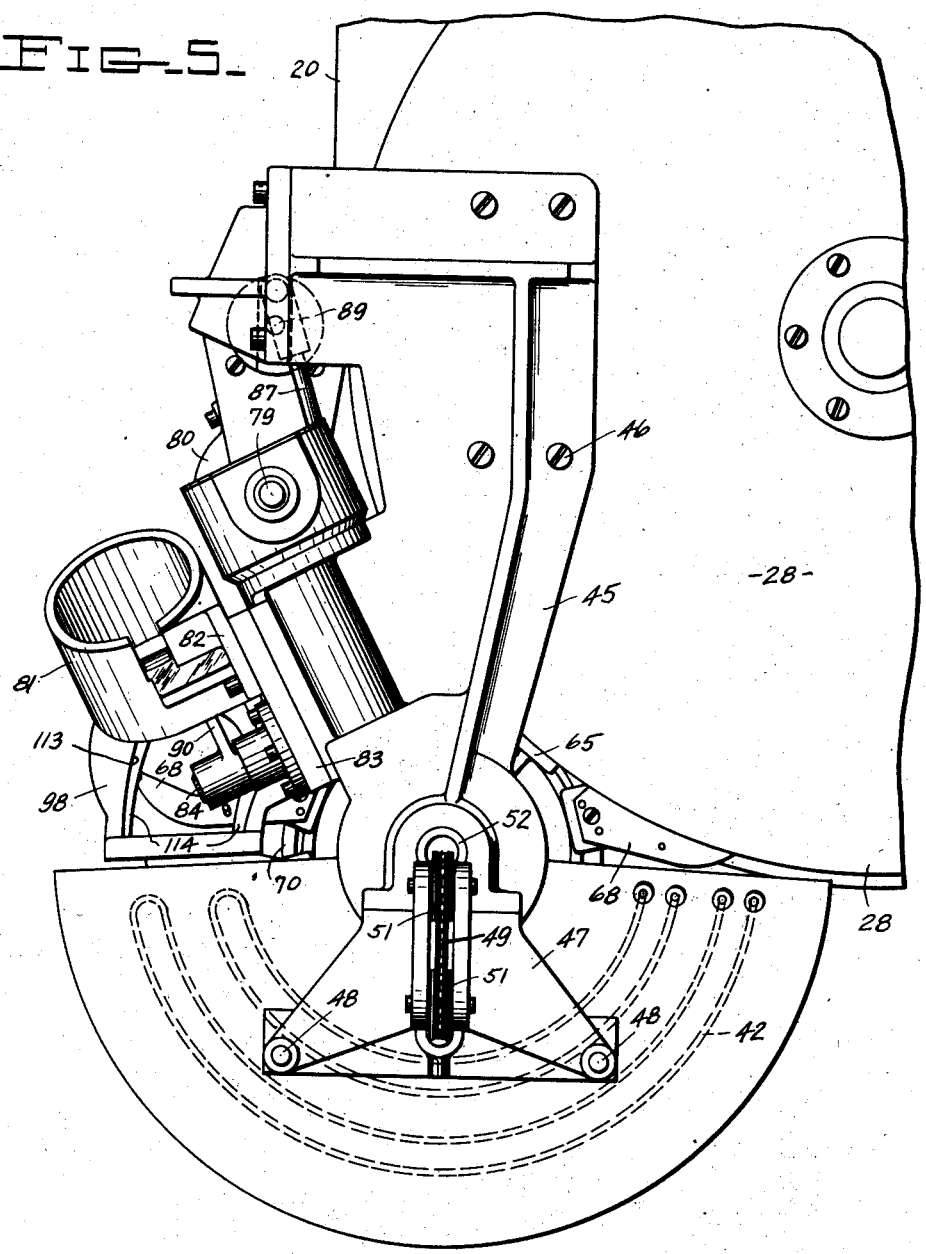

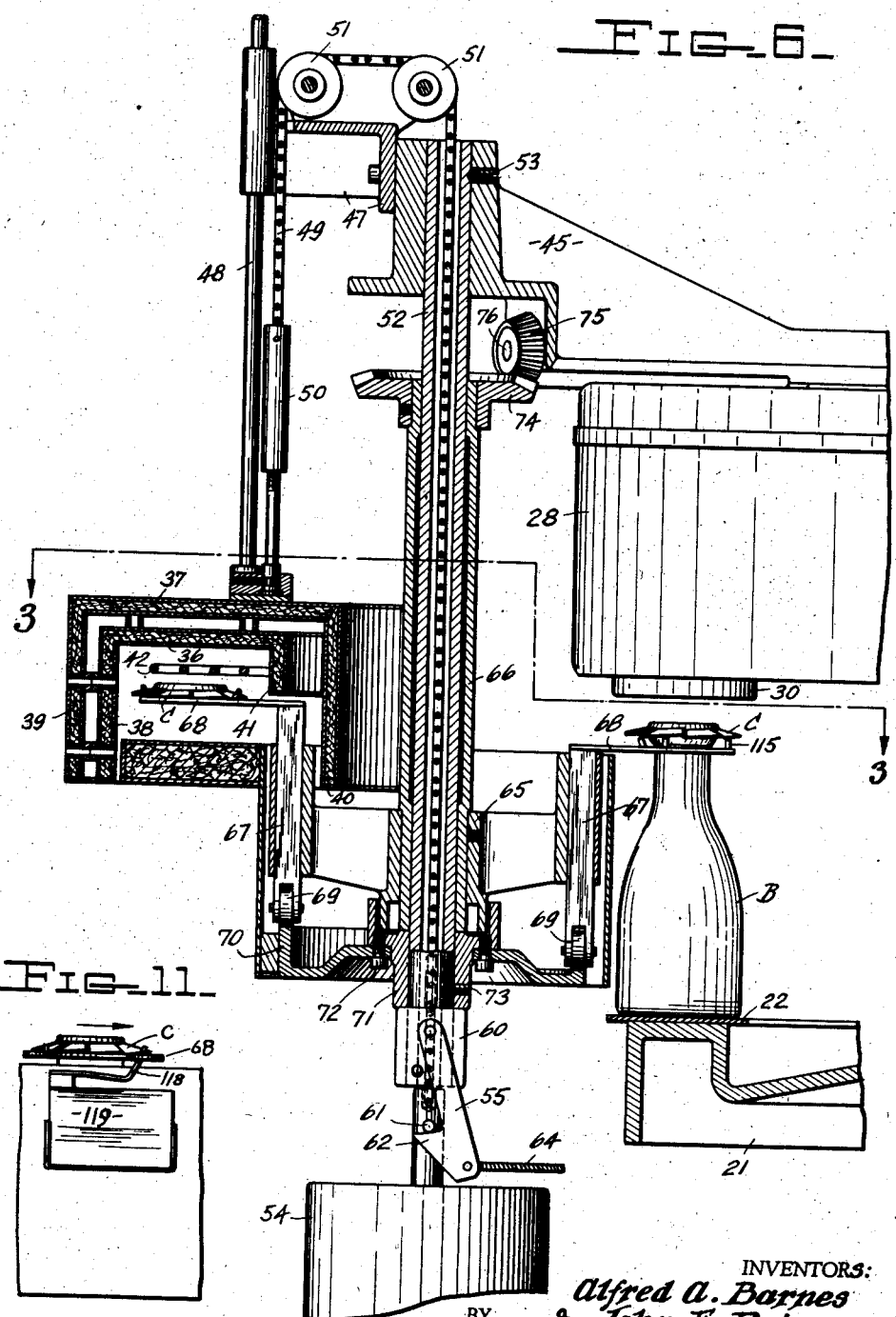

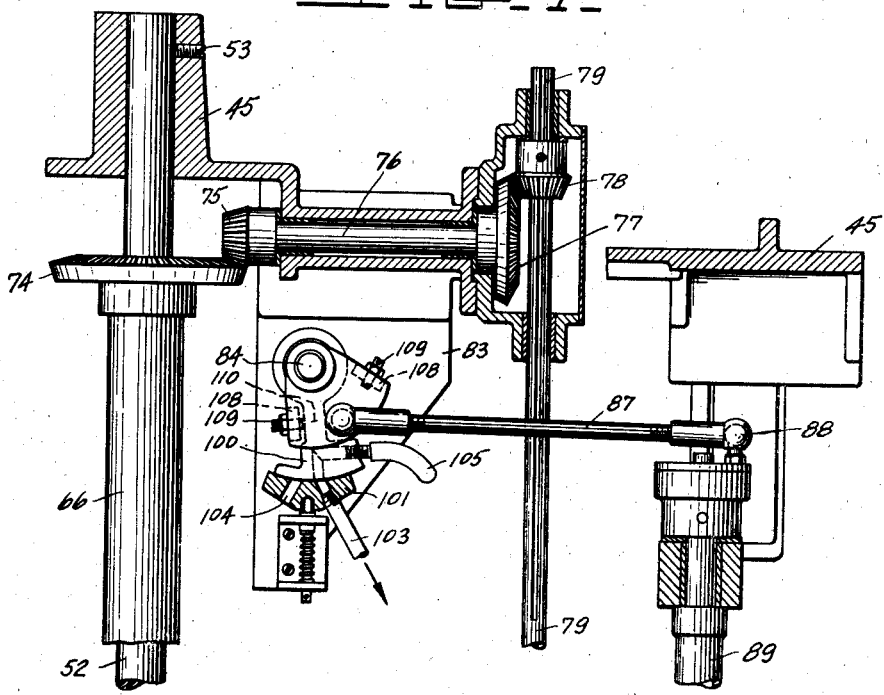
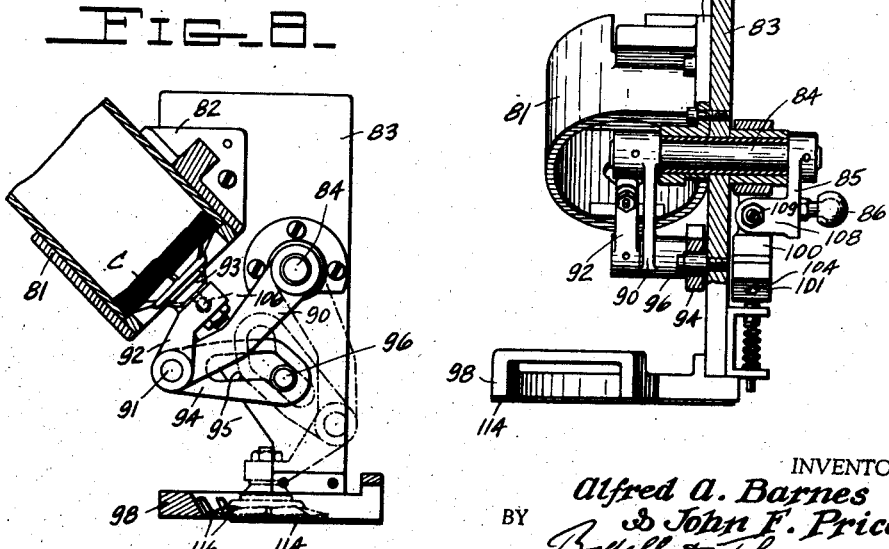

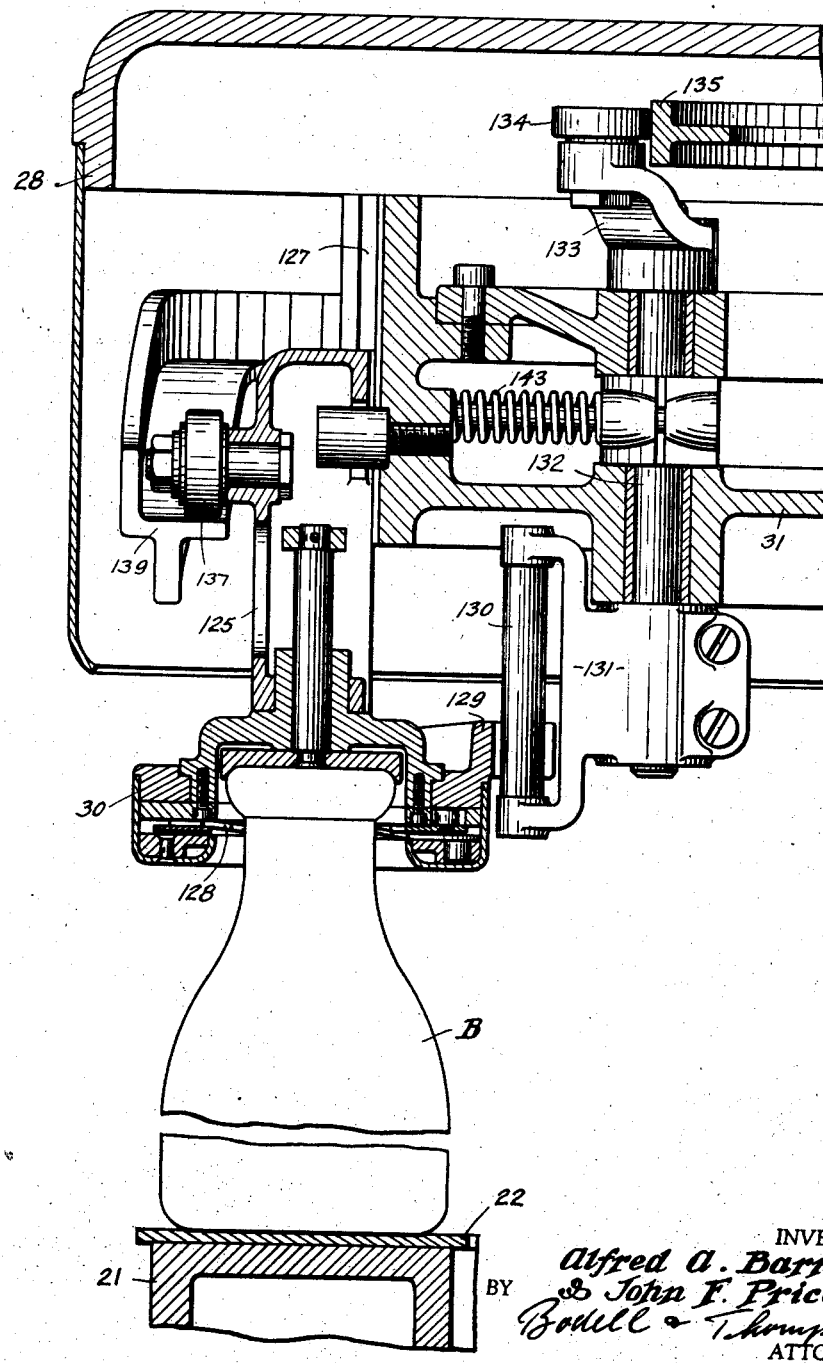

June 29, 1943.   A. A. BARNES ET AL   2,322,812
BOTTLE CAP APPLYING MACHINE
Filed July 26, 1939    9 Sheets-Sheet 9

INVENTORS:
Alfred A. Barnes
& John F. Price,
BY Bodell & Thompson
ATTORNEYS.

Patented June 29, 1943

2,322,812

UNITED STATES PATENT OFFICE 2,322,812

BOTTLE CAP APPLYING MACHINE

Alfred A. Barnes, Syracuse, and John F. Price, Fulton, N. Y., assignors to Oswego Falls Corporation, Fulton, N. Y., a corporation of New York Application July 26, 1939, Serial No. 286,638

19 Claims. (Cl. 226—83)

This invention relates in general to a machine for applying closures to containers, and more particularly to a machine for applying closures in the nature of flexible hood caps which caps, or at least the skirts thereof, are coated with a substance rendered adhesive by the application of heat to make the caps self securing after they have been applied to and contracted about the bottle.

The machine illustrated in the accompanying drawings is intended specifically to apply paper material hood caps to milk bottles. The caps are coated with an adhesive which is activated, or rendered tacky, by heat. The skirt portion of the cap is molded or contracted about the top of the bottle, and the overlapping folds or pleats are secured together by the adhesive to retain the cap on the bottle.

The invention has as an object a machine of the type referred to embodying a particularly economical and efficient means for heating the caps previous to their application to the bottles, the heating means occupying a minimum of space and embodying a novel structure by which the caps are quickly and properly heated.

The invention has as a further object an improved and simplified structure for effecting transfer of the caps through the heating oven and applying the caps to the tops of the bottles, while the bottles are advanced in a continuously moving procession.

The invention has as a further object the provision of means which is operable, upon cessation of the advancement of bottles, to reduce the heat transfer from the heating oven to the caps then being heated thereby, whereby such caps will not become overheated or ignited.

The invention has as a further object a provision of means for preliminarily centering the bottle with the cap closing heads previous to the application of the caps to the bottles.

The invention consists in the novel features and in the combinations and constructions hereinafter set forth and claimed.

In describing this invention, reference is had to the accompanying drawings in which like characters designate corresponding parts in all the views.

Figure 4 is a transverse sectional view of the heating oven showing the cap conveyor and contiguous portions of the machine in plan.

Figure 5 is a top plan view of a portion of the machine shown in Figure 1 illustrating the arrangement of the cap heating oven, the drive for the cap conveyor, and the mechanism for transferring the caps to the cap conveyor.

Figure 6 is a vertical sectional view of the cap heating oven and the cap conveyor and contiguous portions of the machine.

Figure 7 is a vertical sectional view of the cap conveyor drive mechanism and illustrating the cap transfer mechanism in elevation.

Figure 8 is a side elevational view of the cap transfer mechanism and contiguous portion of the cap mechanism in section.

Figure 9 is an end elevational view, partly in section, of the structure shown in Figure 8.

Figure 10 is an enlarged vertical sectional view of a cap closing head and contiguous operating mechanism therefor, being taken substantially on lines 10—10, Figure 2.

Figure 11 is a fragmentary side elevational view of the mechanism for removing an unused cap from the cap conveyor.

The machine, to which this invention appertains, is of the general type disclosed in Patent to Wright et al., No. 1,884,952, October 25, 1932, and consists generally of a base or frame upon which is rotatably mounted a bottle carrying turret. A pair of star wheels, or like members, are also rotatably mounted upon the frame in juxtaposition to the turret, one of which serves to feed the uncapped bottles from a conveyor to the turret, and the other is operable to transfer the capped bottles from the turret back to the conveyor.

The machine further includes means for supporting a supply of caps, preferably in stack formation, and an oven for heating a procession of caps advanced from the cap supply to the uncapped bottles as the latter are advanced by the rotation of the turret. An annular series of cap contracting members is arranged above the turret and rotatable in synchronism therewith, the heads being operable to contract the caps, or the skirts thereof, about the tops of the bottles.

More specifically, the machine is to a large extent the same general structure as the machine disclosed in Patent No. 2,177,990, issued October 31, 1939, to Louis J. Madden, this invention consisting of certain improvements on the machine disclosed in the Madden patent.

Figure 3:
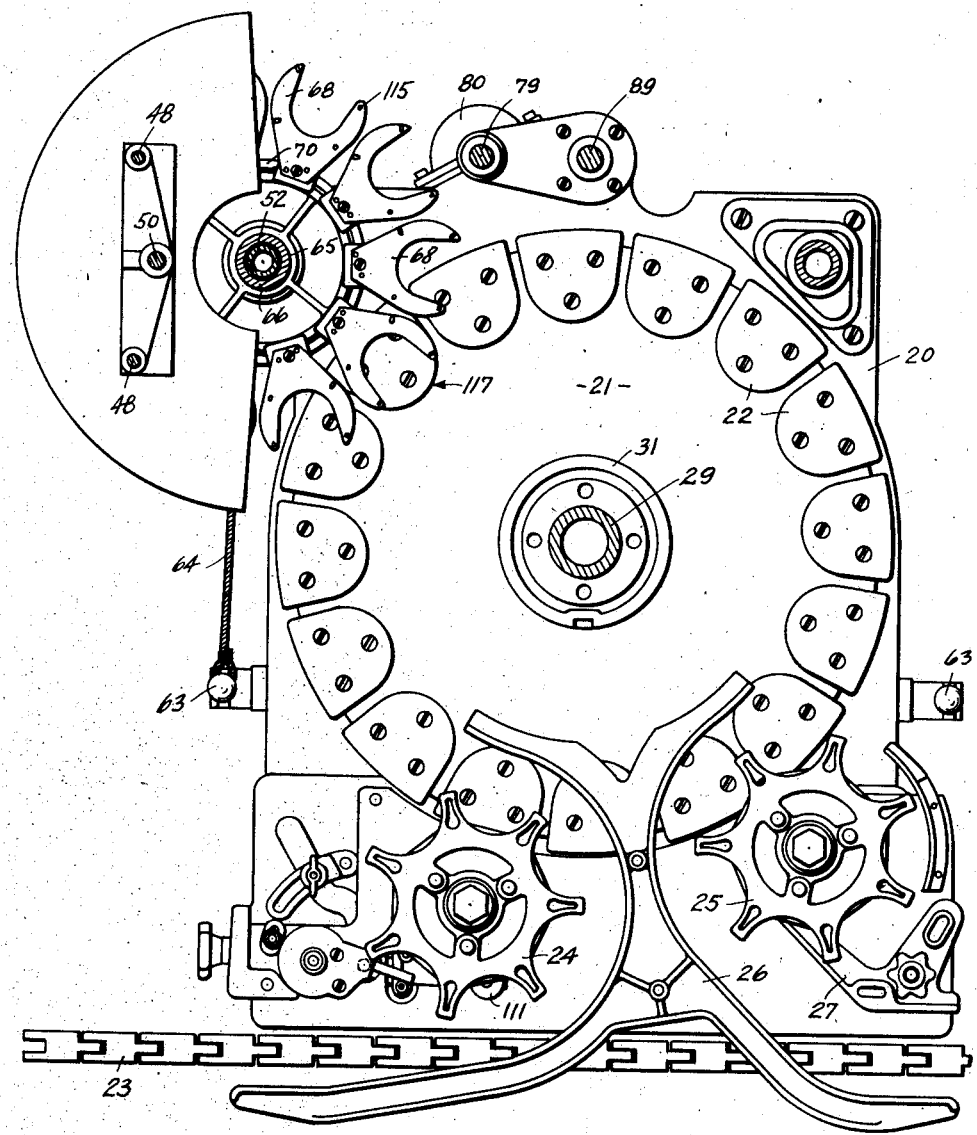
Figure 3 is a view taken substantially on lines 3—3, Figure 1.

In the drawings, the base of the machine is indicated at 20. A turret 21 is rotatably mounted upon the base and provided about its periphery with a plurality of bottle pads or seats 22. The machine is arranged in juxtaposition to a bottle conveyor indicated at 23, and the bottles are fed from the conveyor onto the bottle seats 22 on the turret by means of a star wheel 24 rotated in synchronism with the turret. The bottles are accordingly advanced in a continuous procession and the caps are applied to the bottles while they are traveling on the turret 21. After they have been capped, they are transferred from the turret to the conveyor 23 by a second star wheel 25 which is likewise rotated in synchronism with the turret and with the in-feed star wheel 24. The bottles are guided onto and off from the turret by guide rail members 26, 27, as shown in Figure 3.

Figure 12:
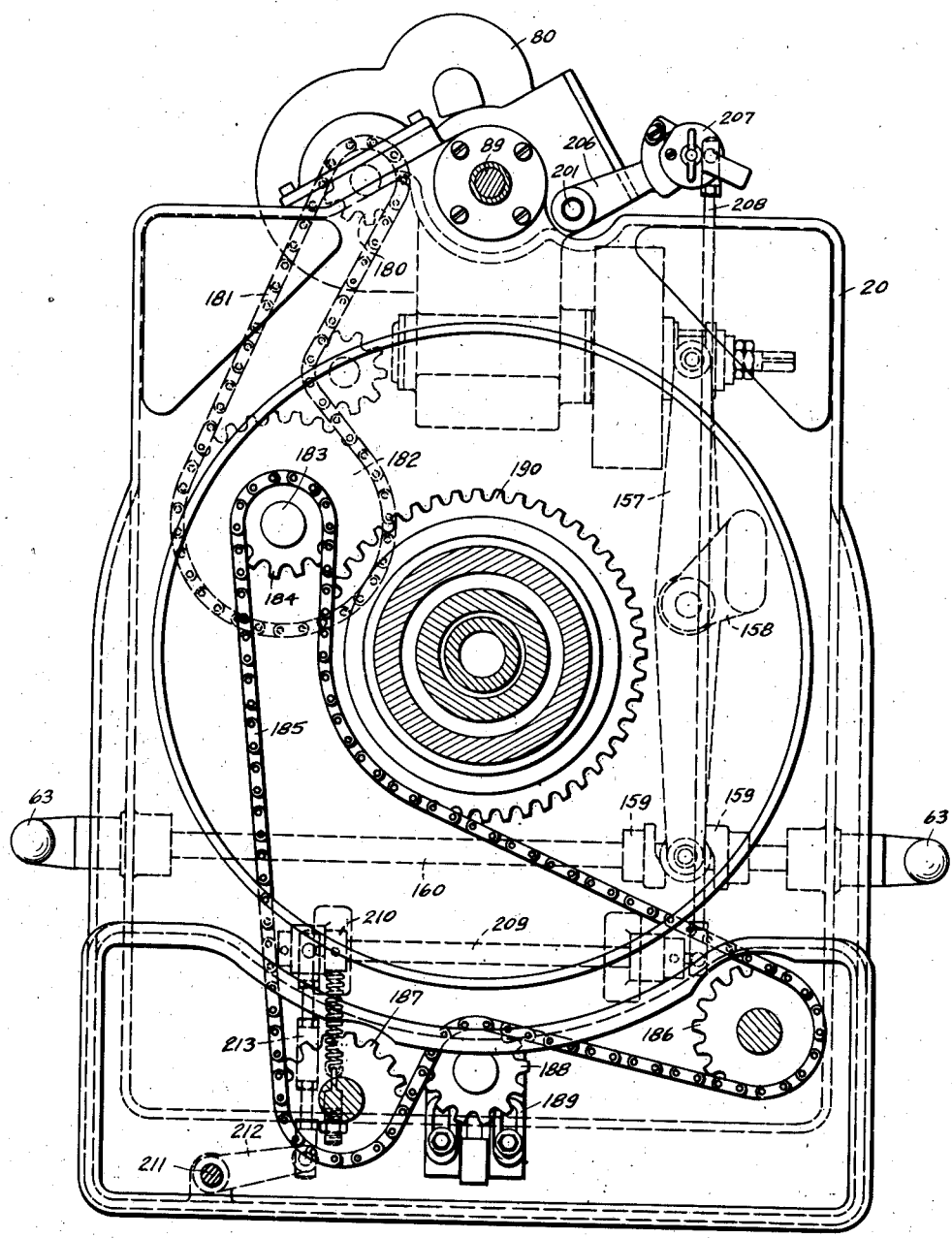
Fig. 12 is a top plan view of the base of the machine with the turret and upper structure removed and parts shown in section.

A substantially cylindrical head section 28 is mounted upon and supported by a post 29 extending upwardly from the base 20. An annular series of cap contracting heads 30 is arranged in the head section 28, the heads 30 being carried at the periphery of a spider member 31 rotatably mounted on post 29 and is slidably connected to a column 31ª extending upwardly from the turret 21. The spider and heads are adjustable vertically relative to pads 22 to accommodate different height bottles. A head 30 is arranged axially above each of the bottle pads 22, and the series of heads 30 rotate in synchronism with the turret 21. Cam means is also arranged in the head section 28, effecting vertical movement of the heads 30 toward and from the bottles B. When the heads 30 descend, the skirt portions of the caps C are folded downwardly about the necks of the bottles, and the heads include means operable to contract the skirt portions of the caps about the necks of the bottles. A motor 33 and motion transmitting means is arranged in the base 20 to effect rotation of the turret 21, and operation of the various elements of the machine. The motor 33 is connected to the transmission 80 through a friction clutch which is moved into and out of engagement by a lever 157 pivoted intermediate its ends on a bracket 158 on base 20. The forward end of lever 157 is moved in a lateral direction by spaced cam collars 159 secured on a shaft 160 extending transversely of the machine and having an operating handle 63 on each end thereof. The driven sprocket 180 of the transmission 80 has trained about it a sprocket chain 181 which is also trained about a sprocket 182, secured to the vertical shaft 183, to the upper end of which is secured another sprocket 184. A second chain 185 is trained over the sprocket 184 and sprockets 186, 187, effecting rotation of the in-feed and out-feed star wheels 24 and 25. See Figs. 3 and 12. The chain 185 is also engaged by an idler sprocket 188 mounted upon a bracket 189 secured to the base 20 and adjustable in conventional manner for maintaining the proper tension on the chain 185.

The chain 185 is also trained about a portion of the periphery of a sprocket 190 secured to the underside of the turret 21. This drive arrangement is conventional in machines of this type, as shown in Fig. 4 of the Madden patent referred to, and it will be apparent that the in-feed and out-feed wheels 24 and 25 are rotated in timed relation to the turret 21.

This invention has to do mainly with the means for heating the caps and applying the same to the tops of the bottles. In bottle capping machines heretofore employed to apply moldable caps, a heating oven was arranged on the top of the top section 28 and the caps were progressed through the oven by conveyor means and discharged onto the tops of the bottles as they were transferred from the conveyor to the turret by the in-feed star wheel. While this arrangement worked satisfactorily, the oven structure was costly and added materially to the bulk of the machine. Also, a comparatively large number of caps were continuously being advanced through the oven, with the result that at the end of a run of bottles it was necessary to run the machine long enough to remove these caps from the oven, and when the machine was started up it was necessary to restock the oven which consumed a considerable period of time inasmuch as the cap conveyor means arranged in the oven was operated in timed relation to the other parts of the machine. Another disadvantage of that structure resided in the fact that if the machine should be temporarily stopped, because of a broken bottle or other reason, the caps in the oven became overheated, and if the machine were stopped over an appreciable length of time it was necessary to shut off the heating element of the oven, or remove the caps from the oven. Otherwise, the caps in the oven would become ignited and burn up.

Figure 1:
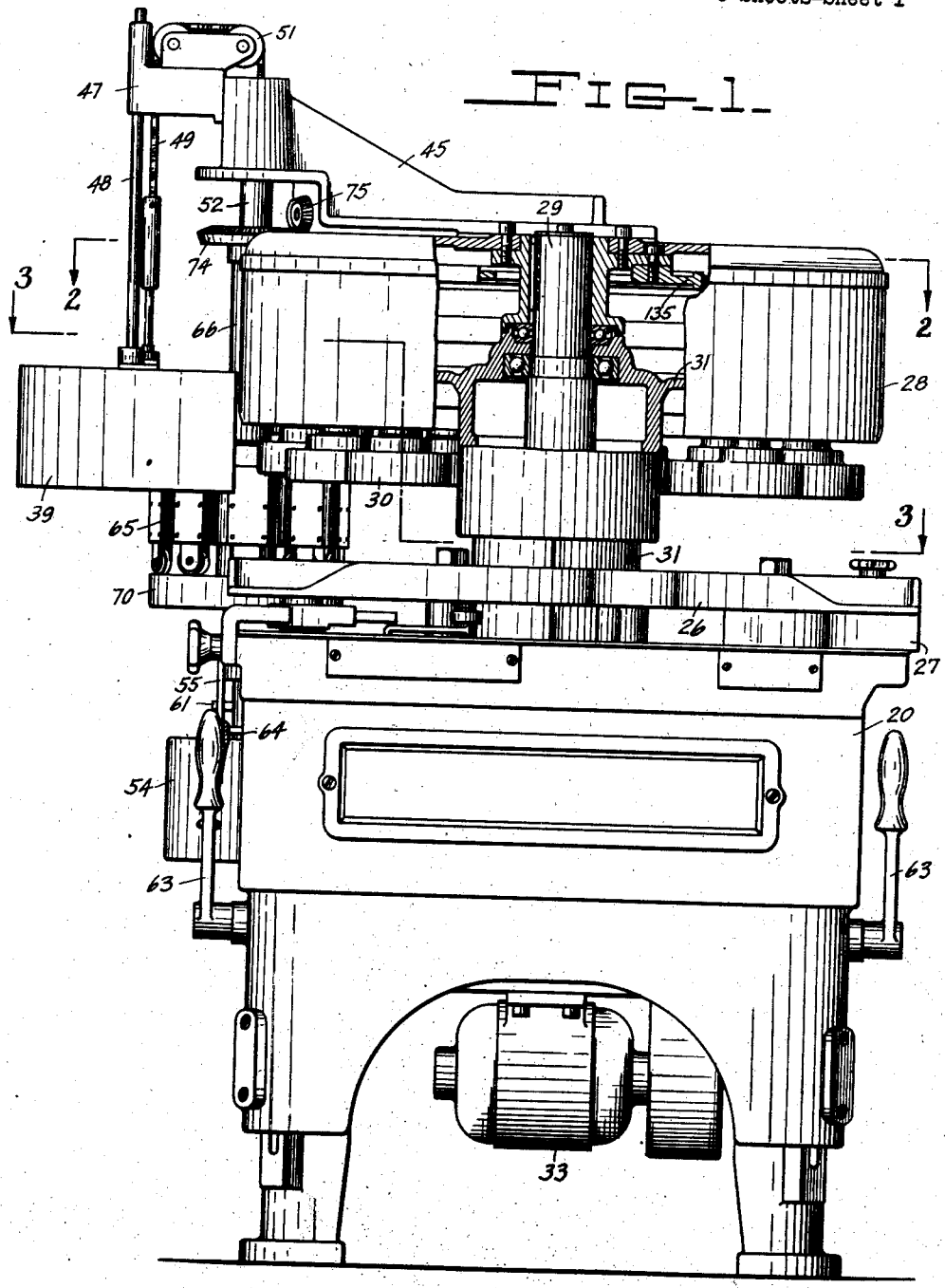
Figure 1 is a front elevational view, with parts broken away and parts shown in section, of a machine involving my invention.
Figure 2:
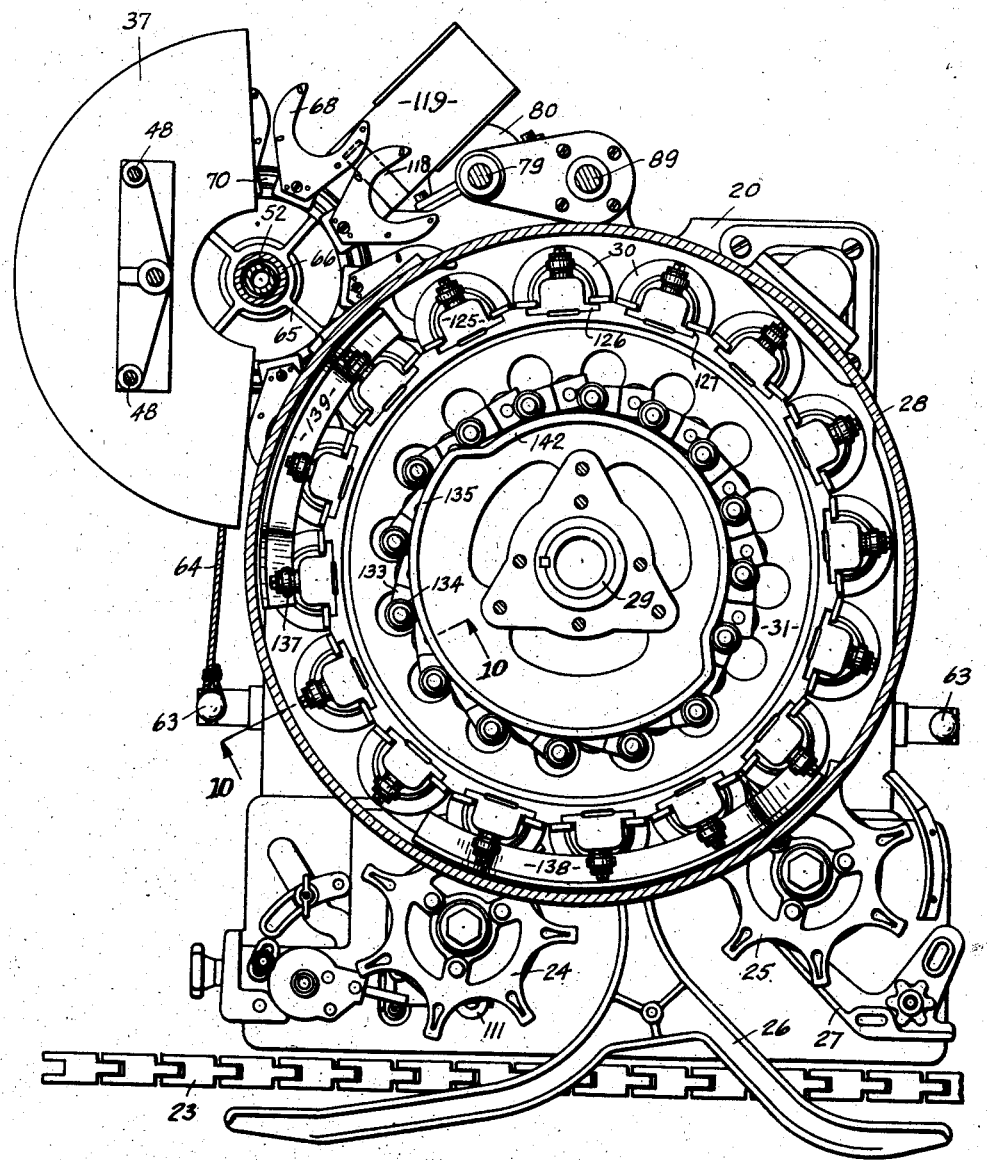
Figure 2 is a sectional view taken on lines 2—2, Figure 1.

The machine herein described is provided with an oven arranged in juxtaposition to the turret intermediate the infeed and output star wheels 24, 25. The oven consists of a casing of substantially semi-circular form comprising inner and outer top walls 36, 37, arranged in spaced apart relationship and being formed with outer depending side walls 38, 39. The top wall 37 is formed with an inner side wall 40, and the inner top wall 36 is formed with a short depending inner side wall 41. The top and side walls of the open are formed of sheet metal enclosing a layer of insulating material to confine the heat within the oven. A plurality of heating elements 42 are arranged adjacent the inner top wall 36 of the oven and extend substantially coextensive therewith. The heating oven and associated parts are supported by a bracket 45 secured to the top of the top section 28, as by screws 46. The bracket 45 extends outwardly beyond the periphery of the head section 28, and a second bracket 47 is secured thereto. The outer end of the bracket 47 is formed with spaced apart apertures to receive the guide rods 48 extending upwardly from the top wall 37 of the oven, and the oven is supported by a chain 49 attached at one end to an adjusting member 50 secured to the top wall of the oven and passing over pulleys 51 journalled in bracket 47 and downwardly through a hollow post 52 secured in the bracket 45, as by screw 53. A weight 54 is attached to the lower end of the chain 49 and is sufficient to overbalance the oven. When the oven is arranged in normal cap heating position, as shown in Figure 2, the weight 54 is supported by a latch 55 pivoted at its upper end to the enlarged portion 60 of the tube 52. The weight 55 is provided with a pin 61 engageable by the detent 62 of latch 55. The latch 55 tends to hang in vertical position, and as the weight 55 is elevated, by movement of the oven into cap heating position, the pin 61 is engaged by the latch and the weight 55 is maintained in its up position. The free end of the latch 55 is connected to a handle 63 by a cable, or the like, 64. The handle 63 operates the clutch in the main drive of the machine. To stop rotation of the turret 21, the handle 63 is moved toward the front side of the machine and the latch 55 is moved out of engagement with the pin 61 permitting the weight 54 to elevate the oven and move it out of heat exchanging relationship to the caps being conveyed through the oven.

The caps C are conveyed through the oven by a conveyor of the turret type. The conveyor consists of a turret member 65 secured to the lower end of a tubular shaft 66 rotatably mounted upon the post 52. The turret 65 is formed with a plurality of circumferentially spaced apart vertically extending apertures to slidably receive posts 67, to the upper ends of which are secured a plurality of fork members 68 extending radially outwardly from the shaft 66. The lower ends of the posts 67 are provided with rollers 69 operable upon a cam track 70 secured to a hub member 71 as by screws 72, and the hub member in turn is secured to the lower end of the tubular post 52, as by screw 73. The cam track 70 is stationary, and the turret 65 is rotated and the fork members elevated in timed relation to the turret 21.

A gear 74 is secured to the upper end of the shaft 66 and arranged in mesh with a gear 75 secured to the end of a shaft 76 journalled in bearings arranged in bracket 45, and the opposite end of the shaft is provided with a gear 77 arranged in mesh with a pinion 78 mounted upon a shaft 79. The shaft 79 extends downwardly into shaft 178 of the drive mechanism arranged in the housing 80 in the base 20, and is rotated in unison with the sprocket 180. The arrangement of the shaft 79, and the gearing operated thereby, is such as to operate the turret 65 in timed relation with the turret 21 as hereinbefore explained.

The caps are arranged in a stack formation in a cap support 81 carried by a bracket 82 secured to a depending bracket 83 which in turn is carried by the bracket 45. The caps are successively transferred from the stack formation to the fork members 68 by mechanism mounted upon the bracket 83. This mechanism comprises a shaft 84 journalled in bracket 83 and provided at one end with a crank arm 85 having a ball and socket connection 86 with a rod 87, the opposite end of which is connected through a similar ball and socket joint 88 to a shaft 89. A second crank arm 90 is fixedly secured to the opposite end of the shaft 84. The free end of the arm 90 is provided with an aperture to receive a pin 91 to one end of which an arm 92 is secured provided with a suction cup 93. An arm 94 is secured to the opposite end of the pin 91 and is provided with a cam slot 95. The arm 92 is arranged substantially centrally of the cap supporting member 81, and the arm 94 is arranged to oscillate in close proximity to the side of the bracket 83. A pin 96 extends from the side of the bracket 83 and is arranged in the slot 95 of arm 94. The arrangement of these parts is such that upon oscillation of the arm 85, the suction cup 93 is positioned against the center of the lowermost cap in the stack formation and is then moved to transfer the cap from the holder 81 and deposit the same in a substantially horizontal position upon a cap receiving member 98, as illustrated by dotted outline Figure 6.

A vacuum is supplied to the suction cup 93 while the cap is being transferred from the cap support 81 to the cap receiving member 98. This is accomplished by a valve member 100 pivotally mounted upon the shaft 84 and provided with an arcuate end portion coacting with a seat 101 carried by bracket 83. The confronting faces of the members 100, 101 are provided with one and two ports respectively. A suction pipe 103 is connected to one of the ports in the seat member 101. The other port 104 is open to atmosphere. A flexible conduit 105 is connected to the port in the oscillating member 100 and extends to an aperture 106 in suction cup 93. The oscillating arm 85 is in the nature of a quadrant having inwardly extending portions 108, each provided with an adjustable screw 109, the inner ends of which engage a web portion 110 of the oscillating member 100. Accordingly, as the arm 85 is oscillated in one direction, the suction cup 93 is provided with a vacuum, through conduit 105 which is connected to any suitable source of vacuum, such as a conventional vacuum pump not shown, the arrangement being such as to release this vacuum when the cap has been positioned over the cap receiving member 98. The shaft 89 is operated through one revolution in response to actuation of means operable by each bottle that is transferred from the conveyor 23 to the turret 21. This actuation takes place upon engagement of each bottle with a roller 111. Movement of this roller engages the one revolution clutch which connects the shaft 89 with the drive mechanism of the machine. The one revolution clutch may be of any conventional design, such as shown in the patent to Wright et al. 1,884,952, and is arranged in the housing 80 and is actuated by oscillation of the shaft 201, the arm 206 of which is operatively connected through an adjustable joint 207 to link 208 running forwardly through the base 20 and being operatively connected to transversely extending shaft 209, the opposite end of which is provided with an arm 210. A shaft 211 is vertically journaled in the base and is provided at its upper end with a lever having a roller 111 positioned below the star wheel 24 and in the path of movement of the bottles as they pass from the conveyor 23 into the pockets of the star wheel, see Fig. 3. The lower end of the shaft 211 is provided with a laterally extending arm 212 connected to the arm 210 through a link 213. This arrangement is such that as each bottle moves the roller 111 inwardly toward the axis of the star wheel 24, the linkage described effects oscillation of the shaft 201 to trip the pawl of the one revolution clutch in the conventional manner.

From the description, it is apparent that as each bottle is transferred from the conveyor 23 to the turret 21, a cap is transferred from the stack formation and deposited on the cap receiving member 98.

The cap receiving member 98 is in the nature of a flat plate secured to the lower end of the bracket 83 and is formed with a circular opening 112 merging with a rearwardly extending slot having outer and inner converging side walls 113. The caps C are deposited upon and supported by a pair of spaced apart rails 114. The fork members 68 are provided with upwardly projecting pins 115 which pass through arcuate slots 116 formed in the under side of the member 98. The timing of the turret 65, relative to the in-feed star wheel 24, is such that the suction cup 93 is operated to transfer a cap to the cap receiving member 98 when one of the forks 68 is positioned beneath the member 98 and substantially coaxial with the opening 112. The peripheral edge of the cap is engaged by the pins 115, and the cap is moved along the rails 114 and the cap deposited on the fork member as the same enters the heating oven. The relative location of the oven and turret 65 is such that the orbital path traveled by the forks 68 coincides with the path traveled by the bottles on turret 21, and the arrangement of the cam track 70 is such that the forks 68 are lowered below the tops of the bottles at the time the caps are positioned axially above the bottles, as indicated at 117, Figures 3 and 4. The caps are successively deposited on the tops of the bottles and the bottles pass out of the forked members as the turrets 21, 65 rotate. The cam track 70 then elevates the forks to normal cap carrying position to receive the unheated caps as deposited by the suction cup 93.

With this arrangement, a comparatively few caps are confined in heat exchanging relation within the oven. We have found the turret arrangement to be a particularly simple and efficient mechanism for conveying the caps through a heating oven and depositing the same on the tops of the bottles. Should the turret 21 be stopped for any reason, the oven is immediately elevated out of heat exchanging relation to the caps within the oven, whereby the same do not become overheated or scorched. Also, at the end of the bottle run there are no unused caps remaining in the oven inasmuch as the caps are transferred from the stack to the conveyor 55 after the bottles have entered the in-feed star wheel 24 and are on their way through the machine. The same applies when the machine is initially started up. By the time the first bottle reaches a position to receive a cap, a cap has been transferred through the oven and properly heated for application.

In the event a cap should be transferred from the stack formation to the cap conveyor and there should be no bottle top on which to deposit the cap, means is provided for removing the cap from the cap conveyor in order to prevent the cap from again passing through the oven, or to prevent a new cap being deposited on top of the cap not used. This situation might occur where a bottle with the top broken off thereof would pass into the capping machine. This result is accomplished by a cap engaging member 118 in the nature of a flat spring secured to one side of a chute 119. The chute 119 is arranged adjacent the orbital path of the forked members 68 between the cap receiving member 98 and the turret 21, as indicated in Figure 4. The free end of the spring member 118 terminates in a plane above the forked members 68 at this point and is depressed by the forked members as they travel over the spring 118. Accordingly, if a cap remains on any of the forked members, it is removed by the spring 118 and deposited in the chute 119.

The machine further includes means operable to preliminarily position each bottle placed upon the turret in register with the cap applying heads 30, whereby the caps will be placed concentrically on the tops of the bottles by the fork members 68, and the caps will be evenly folded about the top of the bottle by the heads 30.

The heads 30 are slidable vertically in the periphery of the spider member 31. The heads comprise a body section 125 formed with side flanges 126 slidably arranged in vertically extending grooves 127 formed in the periphery of the spider member 31. The body portions 125 are formed at their lower end with a recess to receive the top of the bottle. A plurality of movable jaws 128 are arranged in the lower end of the heads and are actuated radially to contract the skirt portion of the cap about the neck of the bottle by an annular member 129 which is oscillated by a pin 130 secured to an arm 131 which, in turn, is secured to a shaft 132 journalled in the spider member 31. An arm 133 is secured to the upper end of the shaft 132 and is provided with a roller 134 engaging a cam track 135 positioned above the spider 31.

The heads 30 descend by gravity to fold the caps about the top of the bottles and are moved upwardly by rollers 137 coacting with cam tracks 138, 139 secured to the inner side of the head section.

The cam track 139 is arranged intermediate the infeed star wheel 24 and the cap conditioning oven. The cam track 138 is arranged to elevate the heads 30 as the same approach the in-feed star wheel 25 and to maintain the heads in elevated position until after they pass over the in-feed star wheel 24. That is, the heads 30 pass off from the track 138 and descend into engagement with the bottles on the turret 21 immediately after the bottles are positioned upon the pads 22 by the in-feed star wheel 24. The heads remain in engagement with the tops of the bottles for a short distance until the bottles approach the heating oven, at which time the heads are elevated by the cam track 139 and are maintained in elevated position while the bottles are passing in juxtaposition to the fork members 68, and the heads descend immediately after a cap has been deposited on the bottle. The heads remain in lowered position for approximately one-half of the circumference of the turret 21. The jaws 128 are actuated to contract the cap about the neck of the bottle during this movement of the turret. The cam track 135 is formed with a low portion 142 to permit the roller 134 and arm 133 to move inwardly toward the axis of the machine under the influence of a spring 143 which effects partial rotation of the annular member 129, which in turn effects radial inward movement of the jaws 128. The roller 134 is moved outwardly by the high portion of the cam track 135 just previous to the raising of the heads by the cam track 138.

The purpose of permitting the heads to descend into engagement with the tops of the bottles after the same have been fed onto the turret, and previous to the application of the heated caps, is to preliminarily center the bottle with the closing heads 30. This results in the caps being placed concentrically on the tops of the bottles by the fork members 68 and accordingly, when the heads 30 again descend the skirt portion of the caps is folded evenly about the neck of the bottles.

What we claim is:

1. A machine for applying hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mounted in juxtaposition to said turret intermediate said bottle feed means and bottle discharge means, a cap conveyor operable in synchronism with said turret to convey caps through the oven and to successively position the heated caps on the tops of the uncapped bottles on said turret, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

2. A machine for applying hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mounted in juxtaposition to said turret intermediate said bottle feed means and bottle discharge means, an annular series of cap supporting members rotatable in synchronism with said bottle turret and operable to convey caps through said oven and over the tops of the bottles carried by said turret, and means operable to effect relative vertical movement between said cap carrying members and bottles to successively position the heated caps on the tops of the bottles on said turret, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

3. A machine for applying hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mounted in juxtaposition to said turret intermediate said bottle feed means and bottle discharge means, an annular series of cap carrying members rotatable in synchronism with said bottle turret to convey caps through said oven, said members being individually movable vertically, and cam means for effecting vertical movement of said members to position heated caps on the bottles on said turret, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

4. A machine for applying paper material hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mounted in juxtaposition to said turret intermediate said bottle feed means and bottle discharge means, a cap conveyor operable in synchronism with said turret to convey caps through the oven and to successively position the heated caps on the tops of the uncapped bottles on said turret, and means operable, upon cessation of rotation of said bottle turret, to reduce heat transfer to the caps on said conveyor, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

5. A machine for applying paper material hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mounted in juxtaposition to said turret intermediate said bottle feed means and bottle discharge means, a cap conveyor operable in synchronism with said turret to convey caps through the oven and to successively position the heated caps on the tops of the uncapped bottles on said turret, and means operable, upon cessation of rotation of said bottle turret, to effect relative movement between said oven and said cap conveyor to reduce the heat transfer to caps on said conveyor, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

6. A machine for applying paper material hood caps to bottles, the skirts of which caps are coated with an adhesive activated by heat to render the cap self-securing; comprising a base, a bottle carrying turret rotatably mounted upon the base, means operable upon rotation of said turret to feed uncapped bottles onto the turret, and means operable to discharge capped bottles from said turret, a magazine arranged to receive a plurality of caps in stack formation, a heating oven mouned in juxtaposition to said turret intermediate said bottle feed means and bottle discharge means, a cap conveyor operable in synchronism with said turret to convey caps through the oven and to successively position the heated caps on the tops of the uncapped bottles on said turret, and means operable, upon cessation of rotation of said bottle turret, to move said oven out of heat transferring relation to the caps on said conveyor, a bottle actuatable controller arranged adjacent the bottle feed means and actuatable by each bottle fed onto said turret, cap transfer mechanism operable in response to actuation of said controller to transfer a cap from said stack to said cap conveyor, an annular series of cap closing heads arranged above said turret and rotatable therewith and operable to contract the heated caps about the tops of the bottles, and motive means for effecting rotation of said turret.

7. A machine for applying caps to bottles comprising a frame, means for advancing a continuous procession of bottles, a series of cap sealing heads arranged above said bottles, and means for advancing said heads in unison with said bottles, cap feeding mechanism operable to deposit a cap on each of said bottles as the same are advanced, means operable to cause each of said heads to move downward into engagement with the bottle below and position the bottle in register with the head and to cause said heads to subsequently move upwardly out of engagement with the bottle previous to the deposition of the cap thereon, and to cause each of said heads to subsequently move downward into engagement with the cap on the bottle and to seal the cap to the bottle.

8. A machine for applying caps to bottles comprising a frame, a turret journalled on the frame, bottle feed mechanism operable to feed a procession of bottles onto said turret, an annular series of cap sealing heads arranged above said turret and rotated in synchronism therewith, cap feeding means operable to deposit a cap on each bottle on said turret, cam means cooperable with each of said heads to cause the same to move downward into engagement with the bottle below the head and position the same in register with the head and to move said head upwardly out of engagement with the bottle previous to the deposition of the cap thereon, said cam means being also cooperable with each of said heads to cause the same to subsequently move downward into engagement with the cap on the bottle and to seal the cap to the bottle, and to subsequently move upward out of engagement with the bottle.

9. A machine for applying hood caps to bottles, the skirts of which caps are coated with a substance rendered adhesive by the application of heat to make the cap self-securing on the bottles, comprising a base, means mounted on the base and operable to advance a procession of bottles, an oven for heating the caps previous to their application to the bottles, conveyor means operable to convey a procession of caps through said oven, means operable to successively effect transfer of the heated caps from the conveyor to the tops of the bottles as they advance, cap contracting members movable in unison with said procession of bottles and operable to contract the caps about the tops of the bottles during advancement thereof, and means operable to remove from said conveyor any caps not transferred from said conveyor to the bottles.

10. A machine for applying hood caps to bottles, the skirts of which caps are coated with a substance rendered adhesive by the application of heat to make the caps self-securing to the bottles, comprising a base, means mounted on the base and operable to advance a procession of bottles, an oven arranged in juxtaposition to said bottle advancing means for heating the caps previous to their application to the bottles, a cap conveyor operable to convey a procession of caps through said oven and over the tops of said bottles, means operable to effect transfer of said heated caps to the tops of the bottles, cap contracting members movable in unison with said procession of bottles and operable to contract the caps thereon about the tops of the bottles during the advancement thereof, means arranged in juxtaposition to said cap conveyor and operable to remove from the conveyor any caps not transferred to the bottles.

11. A machine for applying hood caps to bottles, the skirts of which caps are coated with an adhesive activated by heat to render the cap self-securing; comprising a base, a turret rotatably mounted on the base and operable to advance a procession of uncapped bottles, an oven arranged in juxtaposition to said turret for heating the caps previous to their application to the bottles, a turret cap conveyor arranged in tangential relationship to the turret and operable in unison therewith to advance a procession of caps through said oven and position the heated caps on the tops of the respective bottles, said oven being normally positioned to heat the caps as they are advanced by said turret conveyor, and being movable from said conveyor to reduce the heat transfer to the caps thereon, means which is operable independently of said turret bottle advancing and turret cap advancing mechanisms upon cessation of movement of said cap turret to effect movement of said oven from normal cap heating position, and cap contracting members operable to contract the heated caps about the tops of the bottles.

12. A machine for applying hood caps to bottles, the skirts of which caps are coated with an adhesive activated by heat to render the caps self securing; comprising a suitable frame, means for supporting a supply of cap disks, bottle conveying means operable to convey uncapped bottles to a capping station, a cap disk heating means arranged intermediate said supply and said station, cap advancing means operable to advance cap disks from said supply to said capping station and during such advancement to successively position said cap disks in heat exchanging relation to said cap disk heating means, and means which is operable independently of said bottle conveying and cap advancing means upon cessation of the advancement of said cap disks to reduce the heat transfer from said heating means to the cap disks in juxtaposition thereto.

13. In a machine for applying hood caps to bottles, the skirts of which caps are coated with an adhesive activated by heat to render the caps self-securing; comprising a suitable frame, means for supporting a supply of cap disks, bottle conveying means operable to convey uncapped bottles to a capping station, a cap disk heater arranged intermediate said supply and said capping station, means operable to advance cap disks from said supply to said capping station and during such advancement to successively position the cap disks in heat exchanging relation to said heater, and means which is operable independently of said bottle conveying and cap advancing means upon cessation of the advancement of said cap disks to effect movement of said heater in a direction from the cap disks in juxtaposition thereto to reduce the heat transfer from the heater to said cap disks.

14. A machine for applying hood caps to bottles, the skirts of which caps are coated with an adhesive activated by heat to render the caps self-securing, comprising a suitable frame, means for supporting a supply of cap disks, bottle conveying means operable to convey uncapped bottles to a capping station, a cap heater arranged adjacent said capping station, cap advancing means operable to advance a cap disk from said supply to said capping station simultaneously with the movement of each bottle toward said station and during the advancement of such cap to move the same in heat exchanging relation to said heater, and means which is operable independently of said bottle conveying and cap advancing means upon the cessation of the advancement of said cap disks to effect movement of said heater out of heat exchanging relation to said cap disks.

15. A machine for applying hood caps to bottles, the skirts of which caps are coated with a substance rendered adhesive by the application of heat to make the caps self securing on the bottles; comprising a base, means operable for advancing a procession of bottles to a capping station, a cap heating means, a cap advancing means operable to advance a procession of caps in heat exchanging relation to said cap heating means to said capping station, motive means for operating said bottle and cap advancing means, and means controllable with the control of the advancing means to reduce the heat transfer from said cap heating means to said caps.

16. A machine for applying hood caps to bottles, the skirts of which caps are coated with a substance rendered adhesive by the application of heat to make the caps self securing on the bottles; comprising a base, means operable for advancing a procession of bottles to a capping station, a cap heating means, a cap advancing means operable to advance a procession of caps in heat exchanging relation to said cap heating means to said capping station, motive means for operating said bottle and cap advancing means, and means, controllable with the control of the advancing means, to reduce the heat transfer from said cap heating means to said caps without reducing the heat output of said heating means.

17. A machine for applying hood caps to bottles, the skirts of which caps are coated with a substance rendered adhesive by the application of heat to make the caps self-securing on the bottles, comprising a suitable frame, means mounted on the frame and operable to advance a procession of bottles past a cap applying station, an oven arranged in juxtaposition to said bottle advancing means for heating the caps previous to their application to the bottles at said cap applying station, a cap conveyor operable to convey a procession of caps through said oven and over the tops of the bottles at said cap applying station, means operable to effect transfer of said heated caps to the tops of the bottles at said station, cap contracting members movable in unison with said procession of bottles and operable to contract the caps thereon about the tops of the bottles during the advancement thereof, and means arranged in juxtaposition to said cap conveyor and operable to remove from said conveyor any heated caps which have failed to be transferred from said conveyor to the bottles at said capping station.

18. A machine for applying hood caps to bottles, the skirts of which caps are coated with a substance rendered adhesive by the application of heat to make the caps self-securing on the bottles, comprising means for advancing a procession of bottles, a cap heater, a cap magazine adapted to contain a supply of cold caps, a cap conveyor operable in synchronism with the advancement of the procession of bottles to convey caps through said heater and deposit the heated caps directly on the tops of the bottles in said procession, a bottle actuatable controller arranged to be actuated by each bottle advancing in said procession, cap transfer mechanism operable in response to each actuation of said controller to transfer a cap from said magazine to said conveyor, a series of cap closing heads arranged above said procession of bottles and being operable to contract the heated caps about the tops of the bottles.

19. A machine for applying hood caps to bottles, the skirts of which caps are coated with a substance rendered adhesive by the application of heat to make the caps self-securing on the bottles, comprising means for advancing a procession of bottles, a cap heater, a cap magazine adapted to contain a supply of cold caps, a series of cap supporting members movable in synchronism with the advancement of the bottles in said procession and being operable to convey caps through said cap heater and over the tops of the bottles of said procession, and means operable to effect relative vertical movement between said cap carrying members and the bottles in said procession to successively position the heated caps on the tops of the bottles during the advancement thereof, a bottle actuatable controller arranged to be actuated by each bottle advancing in said procession, cap transfer mechanism operable in response to each actuation of said controller to transfer a cap from said magazine to one of said cap supporting members, a series of cap closing heads arranged above said procession of bottles and being operable to contract the heated caps about the tops of the bottles during the advancement thereof.

ALFRED A. BARNES.
JOHN F. PRICE.